United States Patent [19]

Dumas et al.

[11] Patent Number: 4,642,805
[45] Date of Patent: Feb. 10, 1987

[54] DIGITAL LINK FOR TELEPHONE STATION SETS

[75] Inventors: Gregory P. Dumas, Milpitas; Philip H. Sutterlin, Sunnyvale, both of Calif.

[73] Assignee: Rolm Corporation, Santa Clara, Calif.

[21] Appl. No.: 624,249

[22] Filed: Jun. 25, 1984

[51] Int. Cl.$^4$ .......................................... H04Q 11/04
[52] U.S. Cl. .................................... 370/58; 370/110.1
[58] Field of Search ..................... 370/58, 110.1, 100, 370/84; 371/31; 179/18 ES

[56] References Cited

U.S. PATENT DOCUMENTS

| | | | |
|---|---|---|---|
| 3,569,934 | 3/1971 | Parr, Jr. .................................. | 371/31 |
| 4,042,923 | 8/1977 | Merrick .................................. | 371/31 |
| 4,059,731 | 11/1977 | Green et al. ........................... | 371/31 |
| 4,381,427 | 4/1983 | Cheal et al. ........................ | 370/110.1 |
| 4,382,294 | 5/1983 | Beuscher et al. ................... | 370/110.1 |
| 4,476,559 | 10/1984 | Brolin et al. ...................... | 370/110.1 |
| 4,484,324 | 11/1984 | Orsic ..................................... | 370/58 |
| 4,488,287 | 12/1984 | Carter et al. ........................... | 370/58 |
| 4,488,294 | 12/1984 | Christensen et al. ............. | 370/110.1 |
| 4,497,055 | 1/1985 | Hoshino et al. ....................... | 371/31 |
| 4,510,596 | 4/1985 | Hartmann et al. ..................... | 370/58 |
| 4,512,017 | 4/1985 | Nici et al. .......................... | 370/110.1 |
| 4,520,477 | 5/1985 | Wen .................................. | 370/110.1 |
| 4,530,093 | 7/1985 | Akram et al. ........................ | 370/58 |

Primary Examiner—Douglas W. Olms
Assistant Examiner—Kenneth J. Rokoff
Attorney, Agent, or Firm—Blakely, Sokoloff, Taylor & Zafman

[57] ABSTRACT

A pair of integrated circuits are described which provide a digital link between a branch exchange and a voice and data channel using an ordinary twisted pair. The downlink circuit permits coupling to a serial asynchronous port of different protocol than that used over the link and for instance, this port may be coupled to a keyboard, display or data terminal.

31 Claims, 13 Drawing Figures

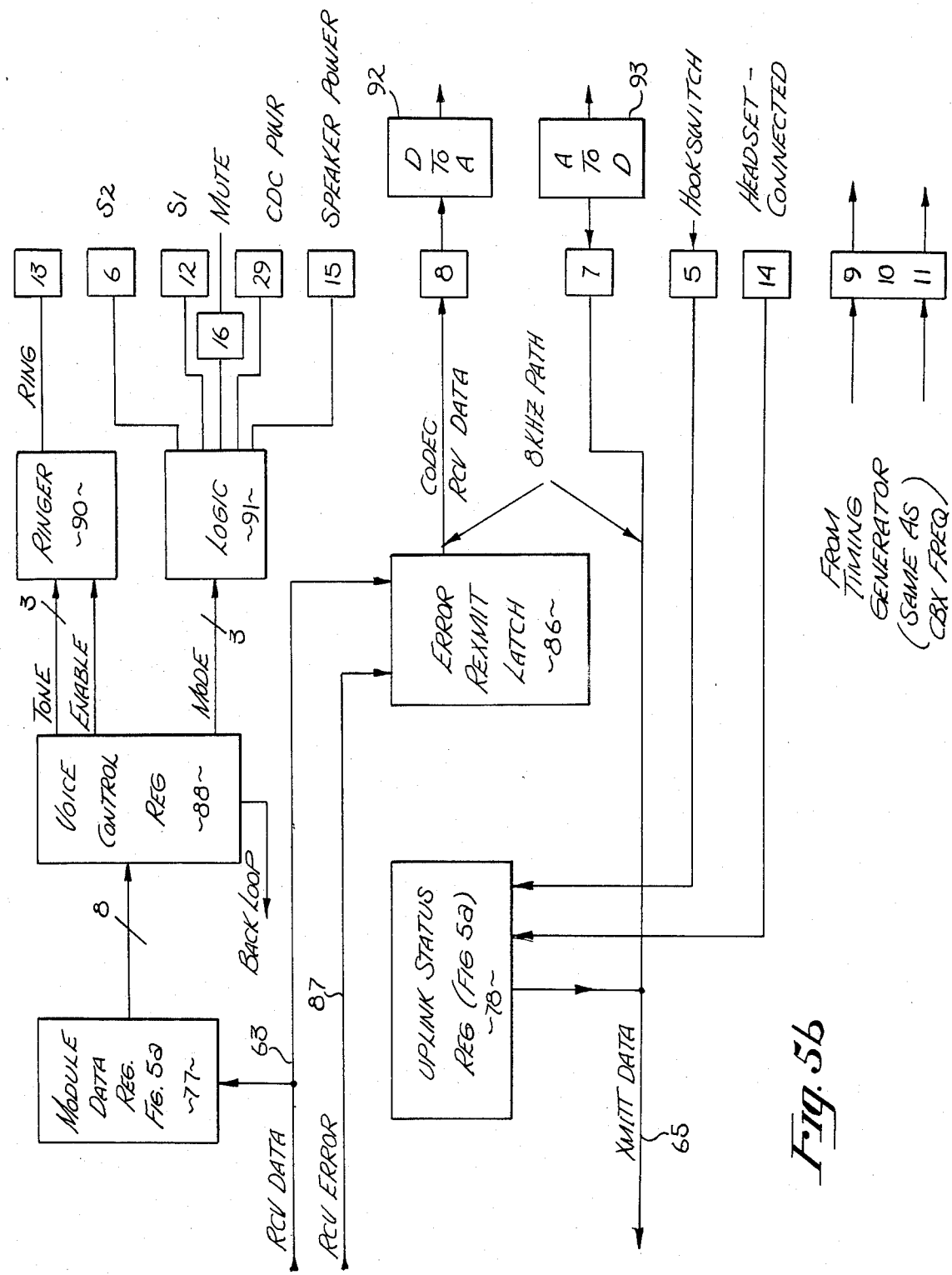

DIGITAL LINK FOR TELEPHONE STATION SETS

BACKGROUND OF THE INVENTION

1. Field of the Invention

The invention relates to the field of digital transmission of voice and data, particularly in conjunction with telephone station sets.

2. Prior Art

Most telephones are connected to a central office or private branch exchange through a pair of leads referred to as a "twisted pair". These twisted pairs represent an enormous capital investment and as such cannot practically be changed. Analog (voice) signals, signalling information and ringing current are all transmitted over this single pair of wires. The twisted pairs are still preferred by installers (for example, over coaxial cable) even for new office building construction because they are very easy (and inexpensive) to install.

Today, it is not uncommon to use digital formats for switching voice signals and for transmitting voice signals over long distances where the twisted pairs are not used. The twisted pairs are relatively poor for transmitting digital signals, thus much of the telephone network has been confined to analog signals. Significant amount of high frequency distortion is inherent in the twisted pairs which deforms the leading and trailing edges of digital signals. In a typical twisted pair installation, there is also significant cross coupling between adjacent pairs, power transients and other problems resulting in signal being lost.

The present invention provides circuits and protocol for the transmission of digital signals over twisted pairs. The present invention, in conjunction with the twisted pairs, provides a digital link between a private branch exchange (computerized branch exchange) and telephone station sets, including sophisticated sets having displays and a link with a variety of data or video terminals. The link allows the transfer of both data and voice (in digital form) over a single twisted pair. The circuits of the present invention along with the protocol have been specifically developed to deal with the problems of digital transmission over twisted pairs.

SUMMARY OF THE INVENTION

A pair of integrated circuits along with line drivers are used to provide a digital link over ordinary twisted pair telephone lines. The link enables simultaneous time (multiplexed) transmission of both voice and data. In the preferred embodiment, the link connects a telephone station set, data terminal or the like, with a computerized branch exchange.

The integrated circuit at the user's end (downlink) includes a modulation means for modulating and demodulating signals which are carried by the twisted pair. The modulation means is connected to a voice means, data means and control means. A timing means synchronized with the digital signals carried by the link couples one field of each transmitted frame to the voice means, a second field to the data means, and a third field to the control means. The control means provides control signals not only to the voice and data means but also provides for selective communication of control signals to a plurality of ports. These ports may themselves be coupled to a serial, asynchronous link of different protocol than that used by the voice, data and control means. By way of example, a port may be connected to a keyboard scanner, display or data terminal.

The integrated circuit at the branch exchange end of the twisted pair (uplink) performs some of the same functions as the downlink circuit and additionally provides the timing conversion from the exchange's data rate to that of the link.

The integrated circuits provide independent error encoding and retransmission of the control fields to verify that the fields were correctly received. Other novel aspects of the invention are described in the following detailed description.

BRIEF DESCRIPTION OF THE DRAWINGS

FIGS. 5a, 5b, and 5c together is a block diagram of one of the integrated circuits of the present invention, the digital link circuit, used downlink (e.g., at a telephone station set).

FIG. 7 is a block diagram of the other of the integrated circuits of the present invention, the integrated channel circuit, used as the computerized branch exchange, or the like.

FIG. 9 is a block diagram of the demodulator which is part of the circuits of the present invention.

DETAILED DESCRIPTION OF THE PRESENT INVENTION

An apparatus for providing a digital link between, for instance, a computerized branch exchange and a telephone station set, data terminal or the like, is described. The apparatus is particularly suited for communicating digital signals over existing twisted pair leads commonly used throughout the telephone network. In the following description, numerous specific details are set forth such as specific frequencies, formats, etc., in order to provide a thorough understanding of the present invention. It will be obvious to one skilled in the art that the present invention may be practiced without these specific details. In other instances, well-known circuits and techniques have not been described in detail in order not to unnecessarily obscure the present invention.

COUPLING OF THE APPARATUS OF THE PRESENT INVENTION IN A COMMUNICATIONS NETWORK

The invention, in its presently preferred embodiment, includes a pair of integrated circuits fabricated with well-known, complementary metal-oxide-semiconductor (CMOS) technology. One of these "chips" is referred to as the digital link, large scale, integrated circuit and is located downlink, that is, at the telephone station set, data terminal or the like. The other of the chips, sometimes referred to in this application as the integrated channel circuit (ICC) is typically mounted on a line card within a computerized branch exchange. The chips provide digital signals which are coupled to hybrid networks (see hybrid networks 40 of FIG. 4 and the detailed network of FIG. 8). The hybrid networks provide the driving signal levels for transmitting the digital signals over the twisted pairs. In the presently preferred embodiment, ordinary twisted pair leads with a length of up to 5000 feet are used, however, other leads such as coaxial cable may be used.

Figure 1:
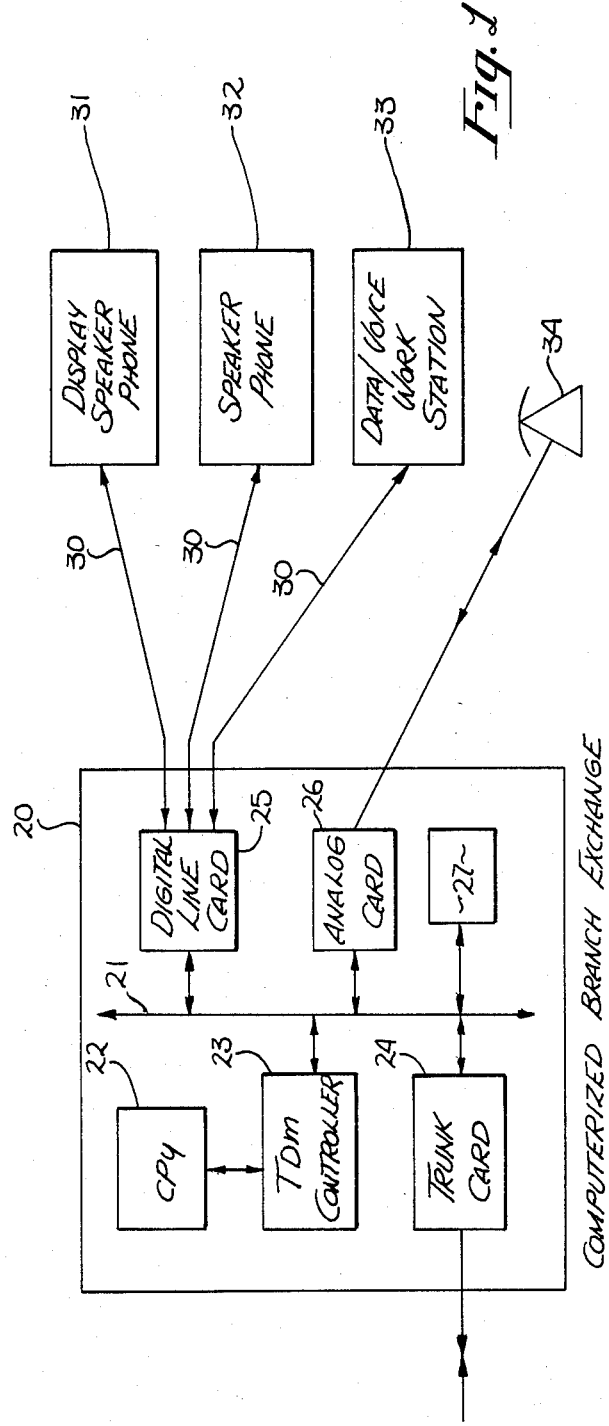
FIG. 1 illustrates a computerized branch exchange and several stations serviced by the exchange. This figure is used to describe the general manner in which the present invention is used in conjunction with a computerized branch exchange.

FIG. 1 illustrates the general manner in which the present invention may be adapted for use with an existing computerized branch exchange such as those available from ROLM Corporation, Santa Clara, Calif. A typical computerized branch exchange 20 includes a time division multiplexed bus 21 over which digitized voice signals and data signals are switched. A CPU 22 controls this TDM bus through a TDM controller 23. Trunk cards 24 provide interface between public telephone networks, or the like. Other cards coupled to the bus 21 to telephone station sets. In some cases, the telephone station sets may employ the existing analog technology as illustrated by the telephone 34 and analog card 26. Other cards are used such as card 27 for receiving data which is switched over bus 21. In a typical application, the analog card 26 converts the analog signals from the telephone 34 to digital signals for switching over the TDM bus 21. The digital signals are converted back to analog form for coupling to a trunk line or station set.

The integrated channel circuit of the present invention is included on a digital line card 25 thereby permitting transmission between various communication means such as a display speaker phone 31, speaker phone 32 or a data/voice work station 33. As previously mentioned, the invented apparatus is particularly suitable for operating over ordinary twisted pairs 30.

Figure 2:
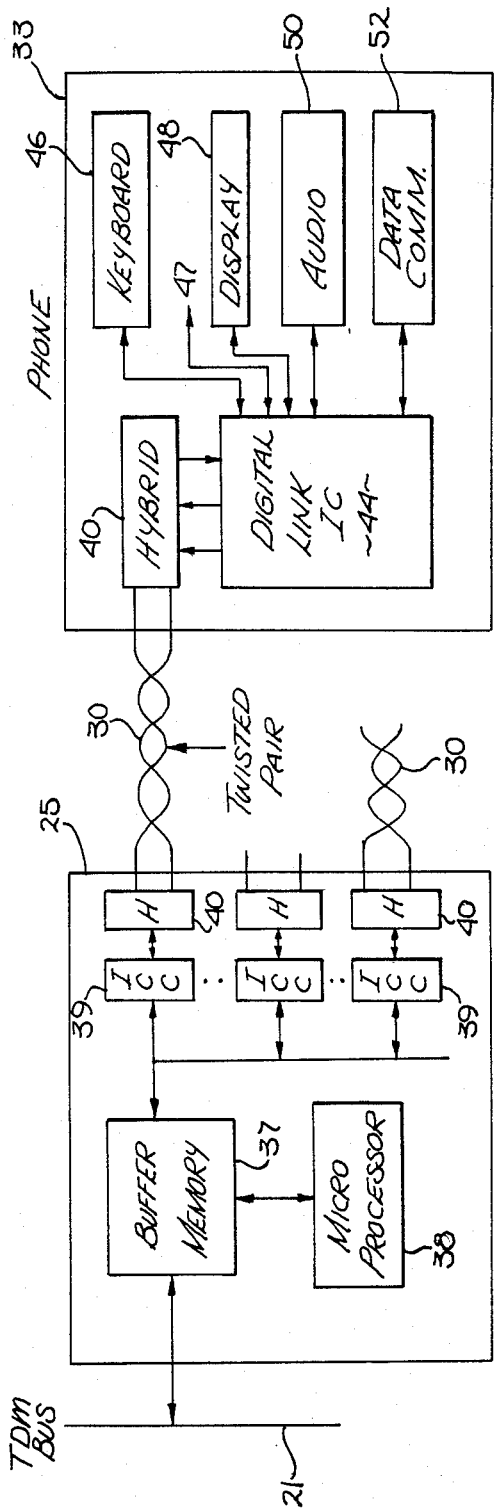
FIG. 2 is a block diagram illustrating a digital line card which is part of the computerized branch exchange of FIG. 1. This digital line card is shown coupled through a twisted pair to a typical telephone staion set. The apparatus of the present invention is shown in very general form in the arrangement of this figure.

In FIG. 2, the line card 25 is shown coupled to the TDM bus 21 through a buffer memory 37. Transfer of data to and from the buffer memory 37 is controlled by a microprocessor 38. Each of the line pairs 30 of FIG. 1 are coupled to a hybrid network 40. These networks are each coupled to the buffer memory 37 through an integrated channel circuit (ICC) 39. This circuit is discussed in more detail in conjunction with FIG. 7.

At the downlink end, the twisted pair 30 is coupled to the hybrid network 40 of station 33. (The uplink and downlink hybrid networks 40 are identical.) The network 40 is coupled to the digital link integrated circuit 44 which is described in detail in conjunction with FIGS. 5a, 5b and 5c. The circuit 44, as will also be discussed, is able to communicate with a keyboard module 46, a processor coupled to a line 47, a display module 48, an audio channel 50, and a data communications channel 52. The keyboard module 46, coupled to line 47 and display module 48 may, in fact, be asynchronous channels employing protocol different than that associated with the audio channel 50 and data communications channel 52.

OVERVIEW OF DIGITAL TRANSMISSION FORMAT USED OVER LINK

Figure 3:
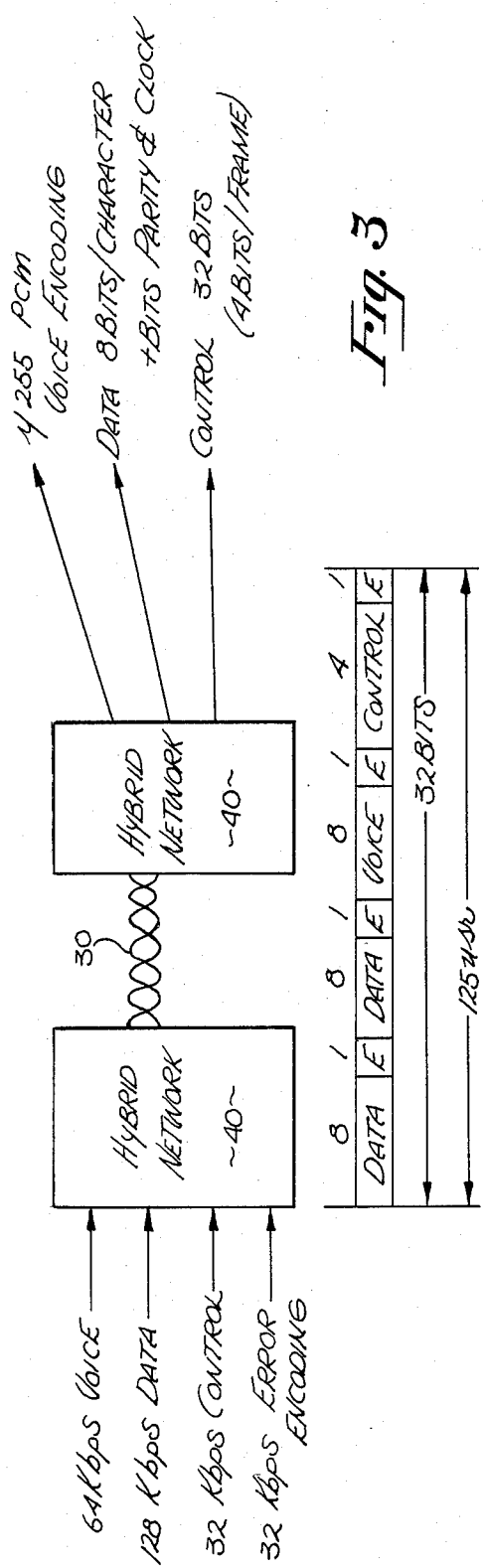
FIG. 3 is a block diagram and chart used to describe the format of digital transmissions used in the currently preferred embodiment of the present invention.

Initially, the ICC transmits a unique pattern to enable the digital link circuit (downlink circuit) to become synchronized. Once synchronization occurs, frames are transmitted in both directions over the lines 30. Each frame, as shown in FIG. 3, includes 32 bits which are transmitted over a period of 125 microseconds. The first field of 8 bits is data, followed by a parity bit. The second field of 8 bits, again data, is followed by a parity bit. The next 8 bit field is voice, again followed by a parity bit. The last field of 4 bits is control with the last bit being a parity bit for these control bits. A complete control message is 16 bits long and is transmitted twice, thus a complete control sequence requires a "super frame", eight of the frames shown in FIG. 3. As will be described in greater detail, the first 8 bits of each control message transmitted downlink are echoed, that is, returned uplink to the ICC 39 from circuit 44 to verify that the control fields have been correctly received. Resynchronization occurs when the "framing" is lost (errors in transmission are sensed initiating resynchronization).

As shown in FIG. 3, the digital link in each direction transmits: 64k bits per second (bps) of voice, a 120k bps of data, 32k bps of control information and 32k bps of error encoding. In the preferred embodiment: voice is encoded, using standard mu255 PCM encoding, data employs 8 bits per character with an additional 8 bits for parity and clock signalling, and as mentioned, control messages are 16 bits in length and repeated once. Manchester encoding is used for transmission over the twisted pairs.

The hybrid networks 40 provide the driving current for a twisted pair 30 and perform a "duplexing" function. Each network receives a differential transmission signal and provides a receive signal for its respective integrated circuit. This is shown in FIG. 4 by the ICC 39 providing XMIT+, XMIT−, to network 40 and receiving the RCV signal.

DIGITAL LINK (DOWNLINK) CIRCUIT

Figure 4:
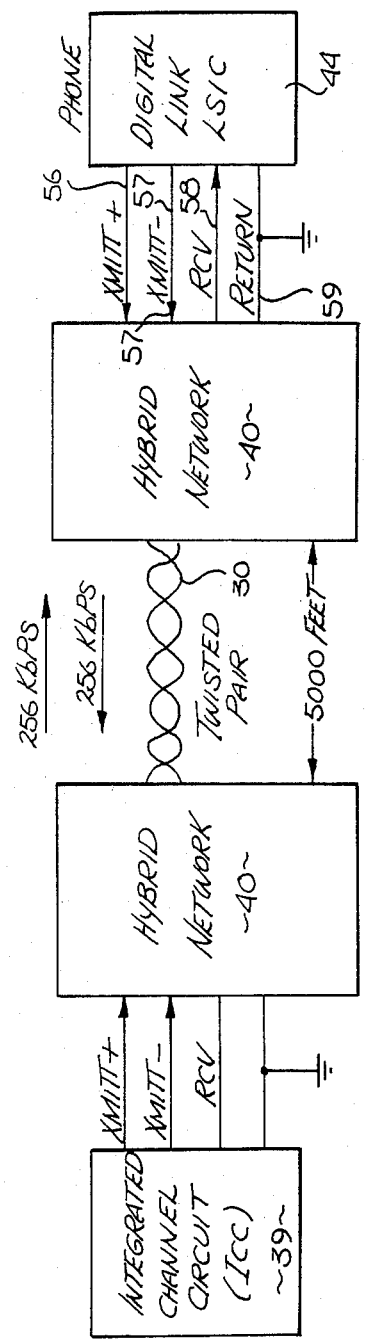
Figure 5A:
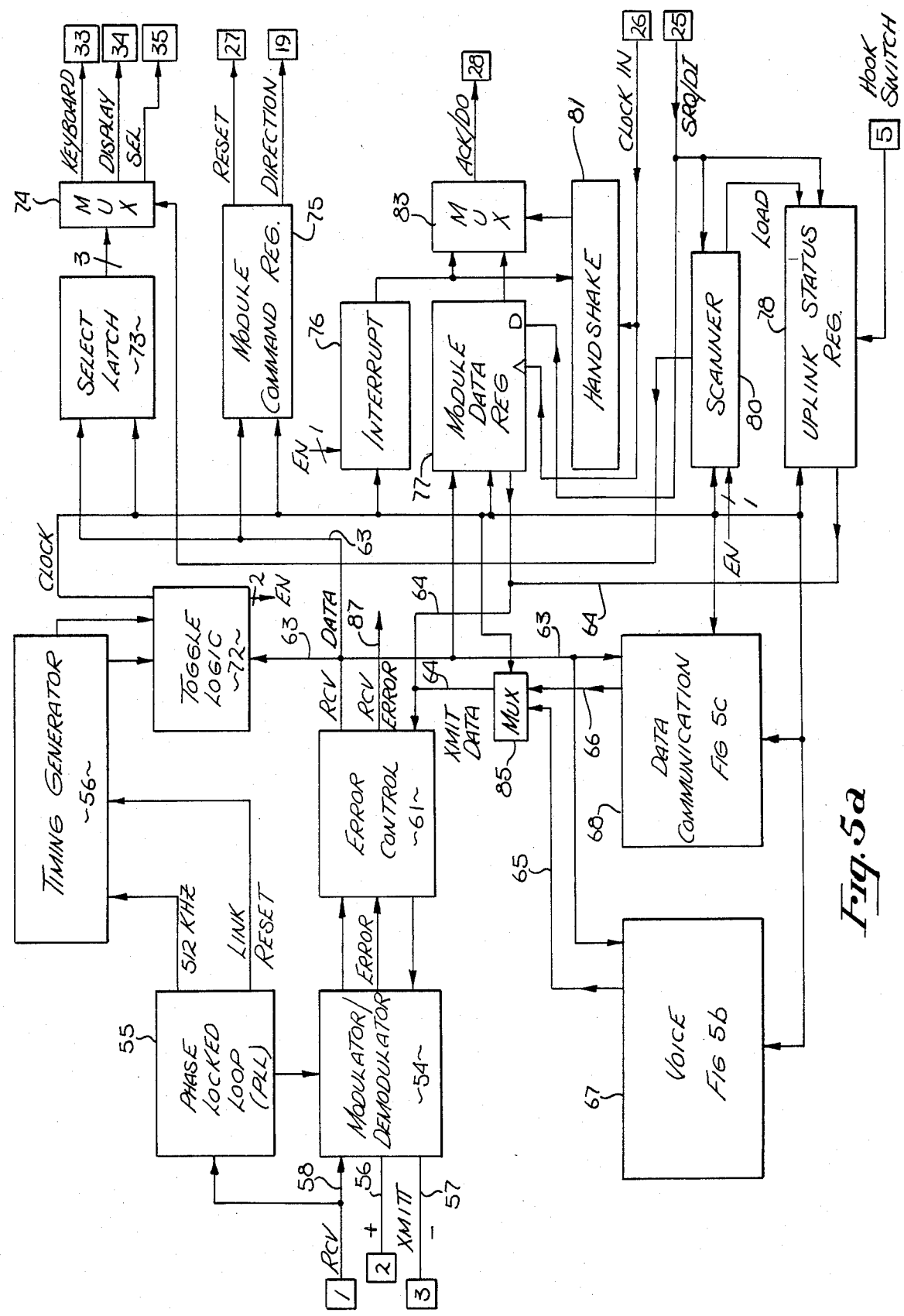

The downlink circuit as shown in FIG. 4 communicates with a hybrid network 40; in FIG. 5a the connections to this network are shown as the XMIT lines 56 and 57 (pins 2 and 3) and the RCV line 58 (pin 1). (Pin numbers for the circuit are shown in squares.) The XMIT line receives signals from the modulator section of modulator/demodulator 54. The receive line, line 58, is also coupled to the modulator/demodulator 54 and is coupled to a phase-locked-loop circuit 55.

Figure 5C:
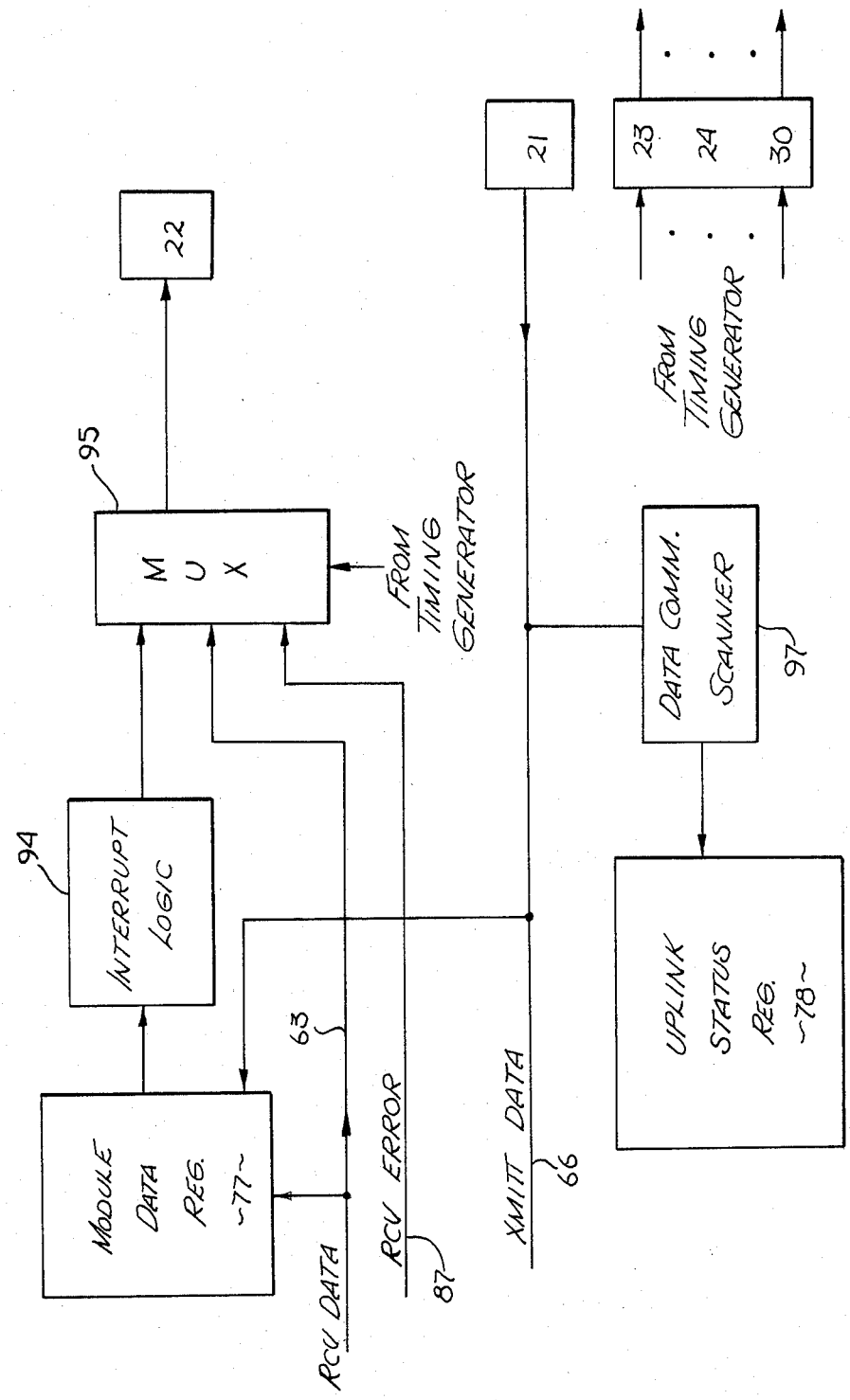

The first two 8 bit data fields (FIG. 3) are, in general, connected to the data communication means 68 which is shown in more detail in FIG. 5c. The 8 bit voice fields are coupled to the voice means 67 which is shown in more detail in FIG. 5b. The control fields are used primarily by the circuitry shown in FIG. 5a for a number of purposes including (i) control of data communication means of FIG. 5c, (ii) control of voice means of FIG. 5b and, (iii) communications with "modules" connected to the digital link circuit such as keyboard, display, etc., (both data and control communications).

The phase-locked-loop circuit 55 is an ordinary phase-locked circuit which permits the digital link circuit to remain locked with the bit rate set by the uplink integrated channel circuit. If and when reception errors are detected by the error control means 61, the ICC retransmits a synchronization signal allowing the phase-locked-loop circuit 55 to resynchronize. This circuit provides a 512 kHz signal to a timing generator 56 along with a link reset signal.

The modulator-demodulator modulates the outgoing data in a Manchester code (basically Orred with a 256 kHz squarewave) and demodulates the incoming Manchester encoded signals. The demodulator section of circuit 54 is described in detail in conjunction with FIG. 9.

The output and input to the modulator-demodulator 54 is coupled to the error control circuit 61. The bit format received by and transmitted between this circuit and the modulator/demodulator circuit 54 is basically the format shown in FIG. 3 (with parity error bits). The error control circuit 61 checks the parity of the incoming data, voice and control signals and generates parity bits for outgoing data, voice and control signals. Circuit 61 provides data, voice and control signals (without parity bits) on line 63 (RCV data) and receives data, voice and control signals without parity on line 64. (XMIT DATA) The circuit 61 provides an error signal on line 87 when a parity error is detected. This signal is coupled to appropriate circuits. For instance, when an error is detected in the data field, a signal is coupled to MUX 95 of FIG. 5c.

The timing generator 56 provides the primary timing for the digital link circuit as will be described. The generator, by way of example, provides the timing signals to assure that the first two 8 bit fields (data fields) are coupled from line 63 to the data communication means circuit 68 and that the third field (voice field) is coupled to the voice means 67. It further causes the control bits in each frame to be coupled to various circuits in FIG. 5a to perform the control functions for the modules, as will be described. The generator likewise provides timing signals for the transmitted data. For instance, to multiplexer 85, to first allows the two 8 bit data field to be coupled to the error control circuit 61 followed by the 8 bit field from the voice means 67, and the four control bits.

As illustrated in FIG. 5a, the digital link circuit permits coupling to three "modules". (The three outputs from the multiplexer 74 (pins 33, 34 and 35) can be decoded to provide selection of more modules where needed.) In the preferred embodiment, the digital link circuit provides communications with a keyboard, display and data terminal.

One of the three modules is selected through the selector latch 73 and multiplexer 74. Service requests from the selected module or data from the module is received at pin 25. Acknowledgement to the modules or data to the modules is sent to the selected module through pin 29. Data to and from the modules is sent in the control fields through the module data register 77. Data from this register, by way of example, may be passed through the multiplexer 83 to one of the three modules. Incoming data from pin 25 can also be passed through this register and then coupled to pins 2 and 3 through the path including line 64.

Figure 10:
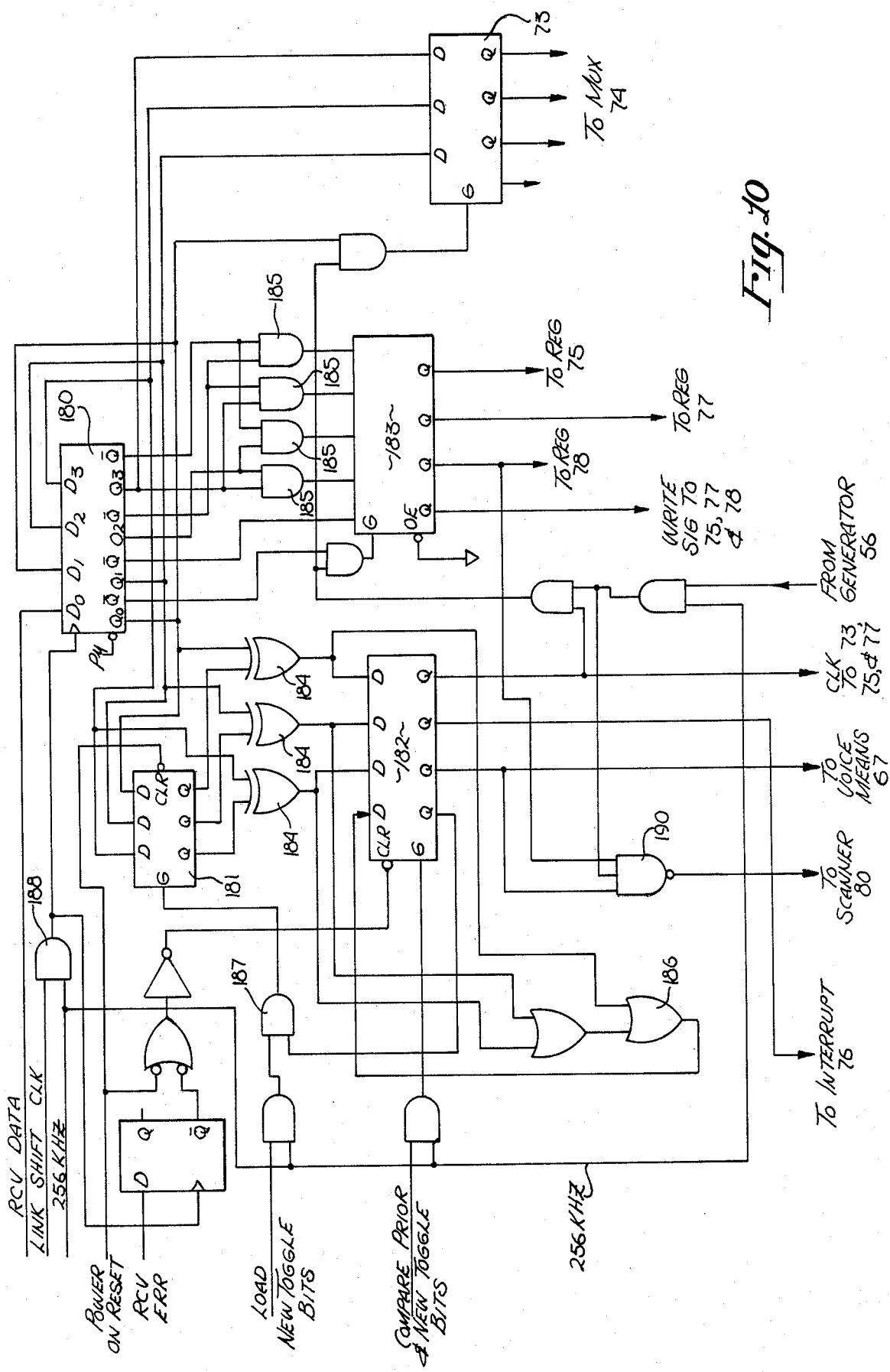
FIG. 10 is a block diagram of the toggle logic circuit which is part of the digital link circuit.

The toggle logic circuit 72 is described in more detail in conjunction with FIG. 10. In general, this logic examines a portion of the control fields to determine when a change has occurred. It controls the loading of the module registers, the interrupt signals over the interrupt means 76 and scanning by the scanner 80.

The scanner 80 causes the modules to be scanned through the multiplexer 74. When a request is received from one of the modules, the scanner stops and allows the uplink status register 78 to be loaded with, for instance, the request for service from pin 25.

The uplink status register 78 provides the status and nature of uplink control transmissions and, for example, indicates an offhook switch condition from pin 5, module interrupts, data communication "active" for means 68 and power failure.

(The function of the elements shown in FIG. 5a will be apparent later, when the operation of the circuit is described.)

Referring to FIG. 5b, the incoming voice fields are coupled on line 63 through a retransmit latch 86 to the output pin 8. A digital-to-analog converter 92 (Part. No. National TP 3054), external to the digital link circuit is used to convert these digital signals to analog form. If an error is detected in the received signal, this is communicated on line 87 to the error retransmit latch 86. The latch uses the previous value if an error occurs. This prevents abrupt changes in the sound waveform which often cause unpleasant sounds if a few bytes of data are lost. Incoming sound signals are converted to digital form by an external analog-to-digital converter 93 and coupled to pin 7 of the digital link circuit. From there, they are coupled directly onto line 65. Timing signals from the timing generator 56 of FIG. 5a are provided on pins 9-11 to the converters 92 and 93.

Control signals for the voice channel are directed to the module data register 77 from line 63. These control words are connected to a voice control register 88 to provide a ringing signal and other functions. Three bits from register 88 are coupled to ringer 99 to allow the selection of several ringing tones at pin 13 and another line is used to enable the ringer 90. Several modes are selectable through register 88 and the logic circuit 91 such as power for a speaker (pin 15) and other static control signals on pins 6, 12 and 29.

An offhook switch condition is sensed directly by the uplink status register and as will be described later, this condition is communicated in a control field over line 65 to the ICC. The presence of a headset is likewise noted by the uplink status register.

The data communications means enables data transmissions over the link at a relatively high rate (128k bps). This data may originate at or be transmitted to a terminal telephone station set, another data link or other data active means. Separate control signals are also sent to and received from the data communications means through the control field.

As may be seen in FIG. 5c, the incoming data fields are communicated over line 63 through the multiplexer 95 to pin 22. Control commands for the data communications means from the control fields are connected to the module data register 77. When a command occurs the interrupt logic 94 couples the command through the multiplexer 95 to pin 22. Error signals on line 87 are also coupled to multiplexer 97 and then to the pin 22. The timing generator controls the switching of MUX 95. It, for instance, selects line 87 when an error is detected in the data field.

Incoming data is coupled directly from pin 21 onto the XMIT data line 66. The data is scanned by the data communications scanner 97 for commands. The presence of these commands is noted in the uplink status register 78 and the commands themselves are communicated to the module data register 77 for transmission uplink as part of the control field.

Timing signals for the data channel are connected from the timing generator 56 to pins 23, 24 and 30.

The data communications means may receive and transmit data independent of the voice data or data which is used as part of the voice means (e.g., telephone with message capability). A terminal independent of the telephone station set may transmit its data over the twisted pair and this data may be switched through the computerized branch exchange to and from a destination totally independent of the voice connection being made. As in apparent, the data transmission is transparent to the voice communications and vice versa.

INTEGRATED CHANNEL CIRCUIT (ICC)

Figure 7:
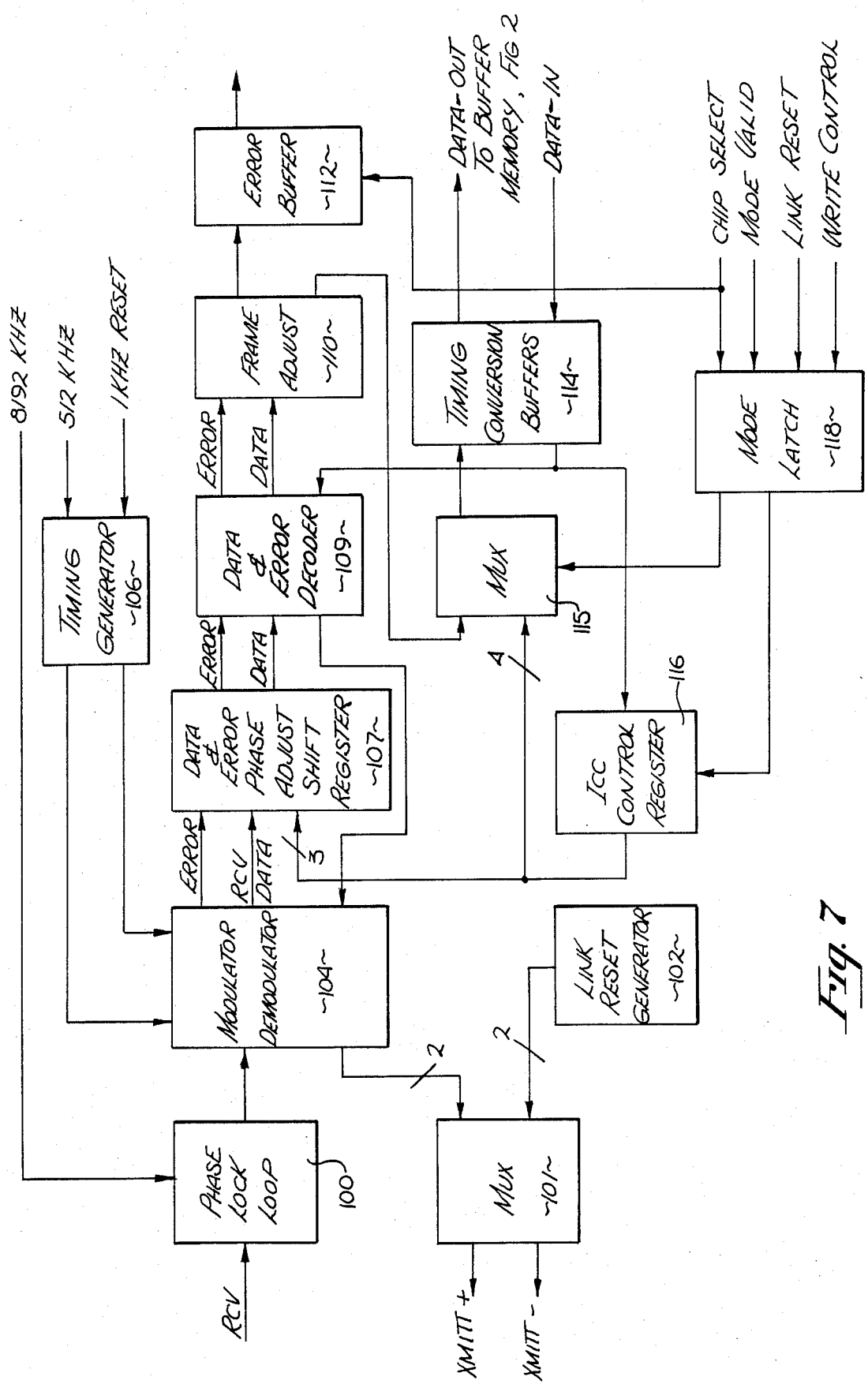

The integrated channel circuit (ICC) of FIG. 7 provides the interface between the hybrid network and the buffer memory is shown in FIG. 2. This circuit does not perform the module interfacing functions of the digital link circuit. However, it provides the buffering between the relatively slow digital transfer over the twisted pair and the more rapid transfers associated with the TDM bus. It also performs a phase shifting function so that all twisted pairs appear to have the same delay. Certain control functions for the link are performed by this circuit. For instance, the link reset signal originates from this circuit (it synchronizes the downlink circuit to the ICC and branch exchange). The ICC performs some of the functions as the digital link circuit such as the Manchester encoding and decoding.

In the case of the ICC, the phase-locked-loop circuit 100 is timed directly by timing signals generated from the computerized branch exchange. In the currently preferred embodiment, the timing generator 106 receives a 512 kHz signal in addition to a 1 kHz reset signal. Thus, the link operates in synchronous with the exchange, although at a lower rate.

The Manchester encoded received bit stream from the link is coupled through the phase-locked-loop circuit 100 to the modulator/demodulator 104. The output of modulator 104 includes the received data from the link (with parity) in the format shown in FIG. 3 and with a demodulator error signal. This error signal is a commonly employed signal which represents the "difficulty" the demodulator had in detecting the received signal during the decoding of the Manchester encoded signals. The data and error phase shift register 107 provides a delay which is a function of the 3 bit signal received from the ICC control register 116. The output of the register 107 is coupled to the data and error decoder 109 where the parity of the data is checked. Both the error and data are then coupled to a frame adjust circuit 110 which provides a fixed time delay. The main data path flows from the circuit 110 through the multiplexer 115 into the time conversion buffer 114. Detected errors are coupled to the buffer memory from the buffer 112 when it is enabled by chip select signal.

The data path from the exchange (through the buffer memory) after passing through the time conversion buffer 114, is coupled to the decoder (and encoder) 109 where the parity bits are generated. From there, the data flows to the modulator-demodulator 104 where it is Manchester encoded before coupling to the hybrid network through the multiplexer 101.

On initialization, the link reset generator 102 transmits a unique pattern to the data link circuit 44 as previously discussed to synchronize the phase-locked-loop of the digital link circuit. Then a predetermined bit stream is coupled into the data-in line from the buffer memory and returned from the data link circuit to the ICC of FIG. 7 (that is, it travels both ways over the twisted pair). The delay, most of which represents delay through the twisted pair, is determined by the microprocessor 38 of FIG. 2. This delay is used to set the delay in register 107. The delay in register 107 is set such that the total delay (including delay over twisted pair, register 107, register 110 and other circuits) is a predetermined delay. This same predetermined delay is used for all the links. Therefore, all the links appear to have the same delay to the branch exchange. The frame adjust circuit 110 provides a delay to bring this total delay to the predetermined delay used in the presently preferred embodiment. If transmission errors occur, the link is reset through the mode latch 118 and the ICC control register 116, this resetting includes the resetting of the delay of the register 107.

The timing conversion buffers 114 provide a time conversion between the rapid transfers which occur with the buffer memory 37 and TDM bus 21 of FIG. 2 and the relatively slow rate of operation associated with the circuits of FIGS. 5 and 7 and the intermediate twisted pair.

As previously discussed, some of the control fields are retransmitted back to the ICC to confirm that they have been properly received by the digital link circuit. To prevent unnecessary waiting for the next frame for data which is not retransmitted, a return path is provided through the ICC register 116 and multiplexer 115.

OPERATION OF THE DIGITAL LINK

Figure 6:
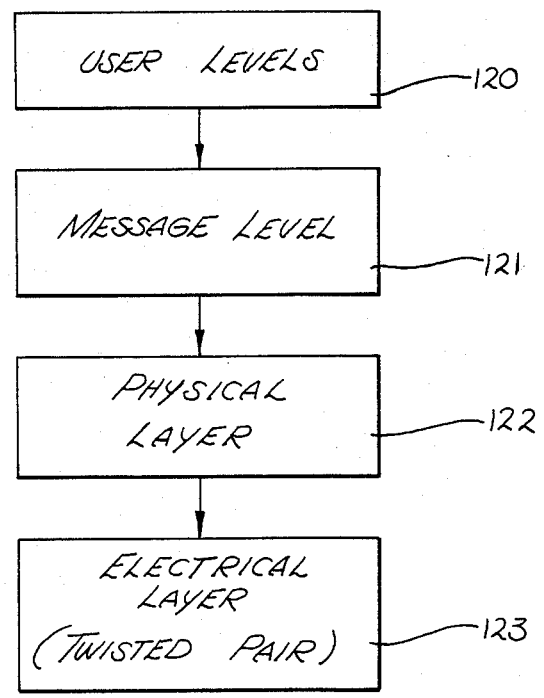
FIG. 6 is a series of blocks used to describe the various protocol levels used in the present invention.

Referring first to FIG. 6, the operation of the digital link is best understood by first noting that there are several layers of protocol involved in each transfer. The uppermost level is the user level 120 as shown in FIG. 6. This, for instance, would involve the user depressing a key on a keyboard. The next level, the message level 121, may be best appreciated by the following analogy. In effect, the ICC sends frames which serve as envelopes for the digital link data conveyed by the digital link circuit. The returned letter and envelope require 16 bits (4 frames) with the 4 frames of control data being repeated. The physical layer 122 is the framing of the data, voice and control signals shown in FIG. 3. The lowest layer, the electrical layer 123, are the signals actually transmitted over the twisted pair which, in the presently preferred embodiment, include the Manchester encoded data and voice control signals with the parity signals.

Assume for sake of discussion that one of the modules coupled to the digital link circuit of FIG. 5a is a keyboard microprocessor, more specifically, a commercial unit (COPS 444L). This commercially available microprocessor is used for scanning keyboards and for providing digital signals representative of the depressed key. Further assume that the circuit of FIG. 5a is scanning, that is, the scanner 80 is periodically selecting modules through pins 33, 34 and 35. When a key is depressed, (corresponding to the user level 120 of FIG. 6) a service request (SRQ) signal appears at pin 25 when the keyboard is selected. This stops the scanning and causes the uplink status register to load a signal from pin 25 into the register indicating that service is requested by the keyboard.

The ICC is continually sending frames of the format shown in FIG. 3 even if no voice or data is passing over the link. A predetermined control field is continually examined by the toggle logic 72 to determine if service is required from the ICC. For the current discussion, a predetermined pattern is returned in the control field from the uplink status register through the error control circuit 61, modulator-demodulator 54 and twisted pair to the ICC to indicate that the keyboard has an event. The actual interpretation that the keyboard has an event is done within the microprocessor 38 of FIG. 2.

The microprocessor then prepares an appropriate message within the control field requesting that the event be transferred. This message is sent via the ICC and twisted pair to the digital link circuit. The control fields are loaded into the registers 75 and 77. The keyboard is selected through pin 33, the module command register 75 establishes a condition, the module data register 77 is cleared and the interrupt circuit 76 generates an interrupt to the keyboard microprocessor requesting the transfer of the event. The keyboard microprocessor then provides the appropriate clocking signals at pin 26 and data on pin 25 is loaded into the module data register. It should be noted that the data is transferred into the module data register at a rate compatible with the keyboard microprocessor. The handshake circuit 81 can accommodate different module protocols. The module data register, by way of example, contains an 8 bit word representative of a particular key which is depressed on the keyboard. The data from the module data register 77 is returned to the ICC (in the control fields), interpreted by the microprocessor 38 and stored in the buffer memory 37. The particular key depression will be scanned through the TDM controller circuit 23 of FIG. 1 over the TDM bus and stored within a memory associated with the CPU 22. And, as in typical computerized branch exchanges, the CPU can respond to a plurality of such key depressions to, for example, complete a connection with the voice channel associated with FIG. 5a.

In a similar manner, commands may be sent to a display by enabling a display through pin 34 and furnishing data to it through pin 28. The data for modules is sent via the control fields.

DEMODULATOR

Figure 9:
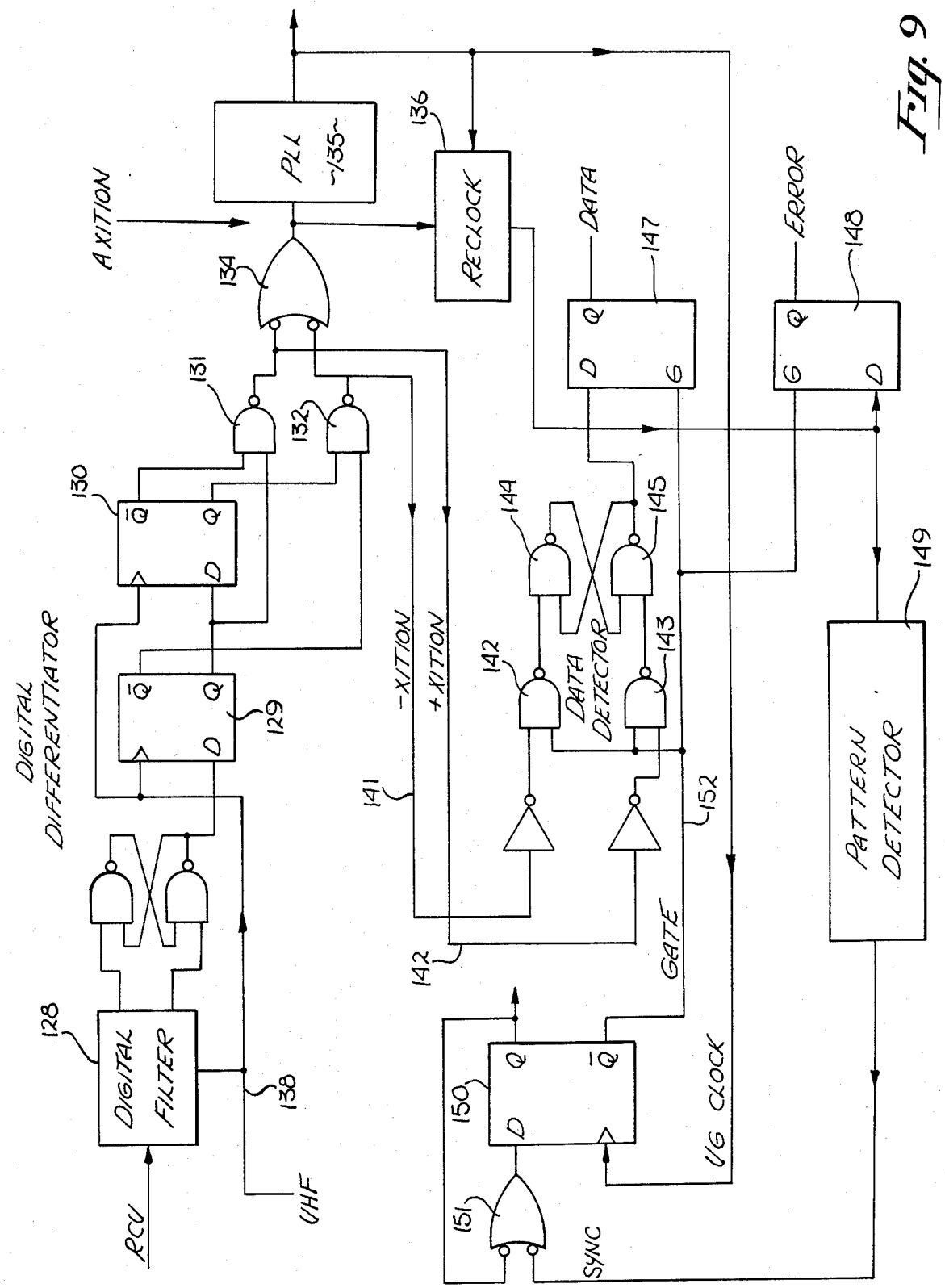
FIG. 9 is a block diagram illustrating the integrated circuits of the present invention and their coupling to the hybrid networks.

Referring to FIG. 9, in general, the received signal is differentiated to determine when the incoming data stream has gone through a positive transition (+XITION, line 142) and negative transition (−XITION, line 141). The output of gate 134 provides a signal for any transition (AXITION). For the employed Manchester encoding, a positive transition represents a binary one, and a negative transition, a binary zero. A window, or gate is developed and it is determined if the transition occurs within this window or gate. If it does not, then an error signal is generated (output of bistable circuit 148).

The received signal is first coupled to a digital filter 128 (hysteresis filter). This filter removes the "skirts" which may precede the leading edge and follow the trailing edge of the data pulses. The output of this filter, after coupling through a latch is digitally differentiated. This differentiation occurs within the bistable circuits, flip-flops 129 and 130. The Q and Q/outputs of these circuits are coupled to the NAND gates 131 and 132. The output of gate 131 provides the positive transition signal, while the output of gate 132 provides the negative transition signal. These two signals are coupled to gate 134 and the output of this gate is the AXITION signal. This signal is coupled to the phase-locked-loop circuit 135 and to a reclocking circuit 136.

While transfer over the link in the presently preferred embodiment is done synchronously with the operation of the branch exchange, nonetheless, both the digital link circuit and integrated channel circuit each have their own crystal-controlled clocks as part of their timing generators. In the presently preferred embodiment, the digital link circuit uses a 6 mHz clock and the ICC uses an 8 mHz clock. These high frequency clocking signals are used (after division) for the phase-locked-loop circuits as is commonly done. The use of this independent time base can cause phase problems particularly when data is being returned to the exchange. A circuit used for providing compensation for these independent time bases is described in conjunction with FIG. 11. The signal on line 138 of FIG. 8 identified as VHF is a timing signal developed from the crystal-controlled oscillator for the digital link circuit or integrated channel circuit. This signal as shown is coupled to the digital filter 128 and the digital differentiator.

The AXITION signal from gate 134 is "reclocked" through reclock circuit 136 to adjust it to the time base of the phase-locked-loop circuit 136. The adjusted signal is coupled to the data terminal of flip-flop 148 and to a pattern detection circuit 149. The pattern detector 149 is a standard circuit used for recognition of predetermined patterns for Manchester encoding. The output of this circuit provides a synchronization signal which is coupled to the data terminal of the flip-flop 150 through gate 151. The clocking signal from the phase-locked-loop 135 (the same signal used for the reclocking circuit 136) is also used for clocking the flip-flop 150. An output terminal of flip-flop 150 (line 152) provides the gate or window used for examining the data determining transitions of the RCV signal after filtering and differentiation.

The data is selected through the NOR gates 142 and 143. One terminal of each of these gates receives the window on line 152. The other terminal of gate 142 receives the negative transition signal from line 141 after passing through an inverter. Similarly, the other input terminal of gate 143 receives the positive transition signal from line 142 after passing through an inverter. The output of the gates 142 and 143 are coupled to a latch comprising gates 144 and 145 with the output of gate 145 providing the datastream to the flip-flop 147. This flip-flop is used primarily to "square up" the waveform and hence, is clocked by the signal on line 152. The final data stream is taken from the Q terminal of flip-flop 147. (In the case of the ICC, this data stream is converted to the exchange clock base through use of the circuit shown in FIG. 11.)

The reclocked AXITION signal is coupled to the flip-flop 148. There is gated by the window from line 152. If the transitions do not fall within the window, an error signal is generated, causing the data from the flip-flop 147 to be ignored.

TIMING CIRCUIT OF FIG. 11

As previously mentioned, the data transfer over the link operates synchronously with the exchanges timed division multiplexed clock. Both the integrated channel circuit and digital link circuit have separate crystal-controlled oscillators for their timing generators, and in particular, for the phase-locked-loop circuits. Because of these different crystals, there is a continuous drifting between the exchange time-division multiplexed (TDM) bus clock and, for instance, the ICC clock. Data being transferred from the ICC to the TDM bus via the buffer memory 37 of FIG. 2 must undergo a shifting between these different time bases.

Figure 11:
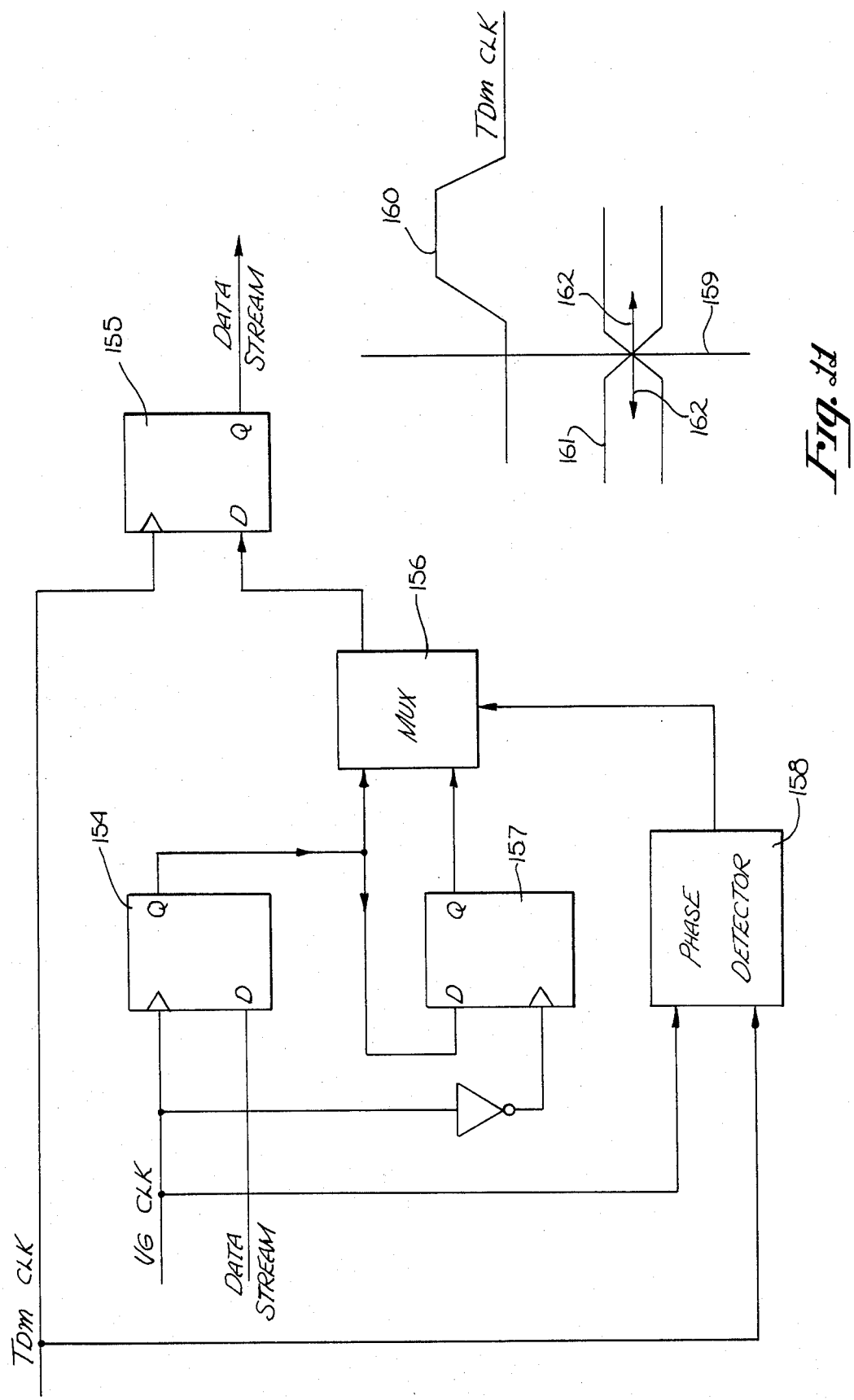
FIG. 11 is a block diagram of a timing circuit of the integrated channel circuit for adjusting the data timing from the link timing to the exchange timing.

Referring to FIG. 11, the data stream in the ICC is coupled through the flip-flop 155. This flip-flop is clocked by the TDM clock (the branch exchange's clock). Assume that the TDM clock is represented by the waveform 160 with its leading edge occurring after time 159. If the leading edge of the TDM clock occur after the data is valid as illustrated in FIG. 11, the output data stream at the Q terminal of flip-flop 155 will be properly timed to the TDM clock. However, in practice, the data waveform 161 will be continually moving to the right and left of line 159 as indicated by arrows 162 ("jittering"). This can cause the data waveform to be distorted by the TDM clock signal, particularly when the data pulses occur to the right of line 159. The circuit of FIG. 11 prevents this from happening by moving the data leading edges away from the TDM clock edges.

The data is first clocked through the flip-flop 154. The time base for this flip-flop is the ICC's timing signal (VG CLK). The output data stream from flip-flop 154 is coupled to one input terminal of a multiplexer 156 and flip-flop 157 which receives the VG CLK signal. The flip-flop 157 is used to provide a time delay. Thus, the two inputs to multiplexer 156 consists of the data stream itself and the data stream delayed. The output of the phase detector 158 selects the data stream or the delayed data stream from multiplexer 156. Phase detector 158 receives the TDM clock and the VG CLK. Based on the result of the phase between these two clocks, the control signal for multiplexer 156 is developed. The phase detector 158 has considerable hysteresis to prevent continuous selection between the two inputs to the multiplexer 156 when only slight variations in phase occur between the two inputs to the detector 158.

The circuit of FIG. 11 assures that the leading edges of the data pulses occurs before the leading edges of the TDM clock. More specifically, for the TDM clock waveform 160 shown in FIG. 11 the data transitions (waveform 161) occur to the left of line 159. Thus, the data pulses are not distorted when passing through flip-flop 155, that is, when shifting to the TDM clock. When the leading edges of the data pulses begin to approach line 159 as determined by the phase difference between the TDM clock and VG CLK, the phase detector 159 causes the multiplexer 160 to select the delayed data stream from flip-flop 157, thereby shifting the waveforms 161 to the left. Similarly, when the waveforms drift too far to the left, the non-delayed bit stream is selected.

TOGGLE LOGIC OF FIG. 10

One of the functions performed by the invented circuits is to communicate a control field from the microprocessor 38 to, for instance, the data register 77 of FIG. 5a. The contents of the buffer memory 37 are continually being sent downlink to the digital link circuit. In a typical case, the microprocessors requires 10, or so, milliseconds to generate a complete control field message. On the other hand, only approximately 1 millisecond is required to transmit the message. Therefore, partial, incomplete control field messages are continually being sent downlink. One of the purposes of the toggle logic of FIG. 10 is to determine when a valid message has been completed and when to accept this message (load).

The control field is divided into three fields. Four bits are designated as a "toggle" field, however, only three are used in the current embodiment. Four bits are used for selection of latches an registers such as 73, 75, 77 and 78 of FIG. 5a. Eight bits are the actual data transferred in the control field.

The toggle field is continuously compared with the previous toggle field, As will be seen, a change in the toggle field is used to indicate that a control message is complete and should be loaded.

The toggle field and register select field of the control messages (control field) are coupled from the RCV data line to a serial-to-parallel register 180 of FIG. 10. This register is clocked through AND gate 188 which receives a link shift clock in addition to the 256 kHz signal. The previous toggle field is stored within register 181. The current and previous toggle fields are compared through exclusive OR gates 184 (only 3 bits used). A change in the toggle field will cause a change at the output of the OR gate 186; this change is coupled through the command latch 182 through gate 187. The output of gate 187 provides a signal which then causes register 181 to load the current toggle field from register 180 so that the current toggle field can now be compared with subsequent toggle fields.

The toggle field provides commands through the latch 182. For instance, it provides a command to the scanner 80 of FIG. 5a through the NAND gate 190, a control signal to the voice signal 67 and clocking signals to latch 73 and registers 75 and 77 of FIG. 5a.

The register select field is decoded through the gates 185 and coupled to the register select latch 183. This field provides a "write" signal to the registers 75, 77 and 78 in addition to individual select signal for these registers. This permits, for instance, the selection of a register for loading of the 8 bit data field from the control field. (The latch 73 of FIG. 5a is shown in FIG. 10 with the 3 output lines coupled to the multiplexer 74.)

If an error is detected in a control message, the toggle logic is reset permitting recognition of the "new" toggle field when the control message is repeated. As mentioned, control messages are repeated at least twice and typically more times than that, since the contents of the buffer memory is continually sent downstream until a new message is generated.

The link has the capability as previously mentioned, to examine the echoes returned unlink to determine if a message has been correctly received. As currently implemented, this echo feature is not used. In effect, there is no "handshake" between the buffer memory and the uplink circuitry to confirm that a message has been correctly received. Since the messages are repeated many times, this in itself has been found to be a satisfactory substitute for a more elaborate protocol.

The toggle logic described above provides certain advantages. First, the control messages generated by the microprocessor 38 can be formed asynchronously with the link logic. Secondly, the microprocessor 38 need not remove messages, there being no harm in the message being continually repeated until the new message is developed. In fact, the continually repeating of the message provides a high degree of self correction.

HYBRID CIRCUIT OF FIG. 8

Figure 8:
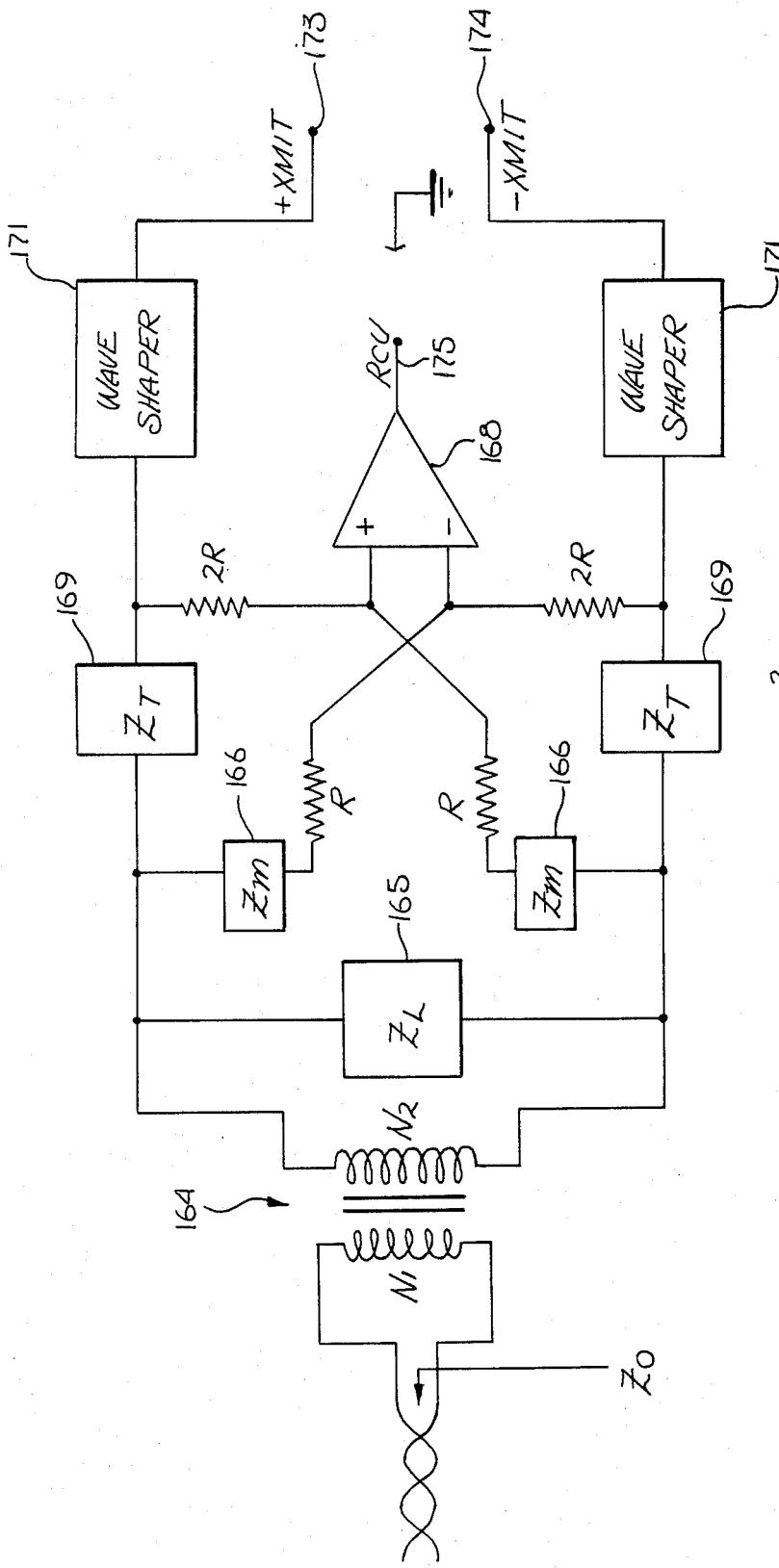
FIG. 8 is a block diagram of the hybrid network used with the circuits of the present invention.

The hybrid circuit performs a traditional function in that it separates the incoming and outgoing signals from/to the twisted pair. The unique hybrid circuit of FIG. 8 provides the RCV signal from the twisted pair at the output of the differential amplifier 168 (line 175) and receives the signal to be transmitted over the twisted pair (differential signal) on lines 173 and 174.

The network includes a ferrite core transformer 164 with a turns ratio in the currently preferred embodiment of: N2/N1=2. The entire network except for the differential amplifier 168 is fabricated from passive components. For purposes of explanation, it is assumed that the twisted pair has a complex impedance $Z_0$.

Assuming for a moment that the impedances 165 is infinite and impedance 166 is zero, an analysis of the remaining circuit will show that the signal on lines 173 and 174 cancel within amplifier 168 and are not present on line 175. On the other hand, the signal received from the twisted pair is sensed at amplifier 168 and is present on line 175. (In the preferred embodiment, R is equal to approximately 10k ohms and substantially larger than $Z_0$.)

The impedance 165 ($Z_L$) is used to compensate for the transformer leakage inductance particularly at high frequencies. If this is not used, imbalance at high frequencies can cause some of the signal from lines 173 and 174 to appear on line 175. The impedances 166 ($Z_M$) are used to compensate for the transformer's finite magnetizing inductance at low frequencies. The wave shaped circuits 171 in the currently preferred embodiment are simple inductances used to limit high frequency components of transmission, thereby reducing the intersymbol interference. $Z_T$, as indicated by the equation in FIG. 8 for the preferred turns ratio is equal to $2Z_0$.

Thus, a digital link for interconnecting telephone station sets, data terminals and the like, with a computerized branch exchange has been described. The link makes use of ordinary twisted pairs.

We claim:

1. A digital link apparatus for providing digital communications between a branch exchange and a telephone station set comprising:
    computer means for preparing messages in a predetermined format, said computer means coupled to said branch exchange;
    uplink circuit means for receiving said messages from said computer means and for preparing said messages for transmission to said telephone station set, wherein said transmission is time division multiplexed;
    a pair of lines coupled to said uplink circuit means for receiving said messages; and,
    downlink circuit means coupled to said pair of lines for receiving said messages from said pair of lines and for preparing said messages for coupling to said telephone station set, said downlink circuit means including:
    (a) control means for receiving and transmitting control signals for said telephone set;
    (b) timing means, synchronized with said messages carried by said pair of lines for coupling one field of voice data from said messages to said telephone station sets and another field of control data to said control means, said control means for communicating control signals to and from said telephone station set;
    (c) logic means coupled to said control means for examining said messages and for determining when a newly completed message has been transmitted to said downlink circuit means, said control means being activated to take action based upon said new message; and
    (d) means for detecting an error in said transmission of said messages and circuit means for reusing the previously transmitted voice data when said error is detected and also for providing a retransmit signal to provide a retransmission to resynchronize said timing means,
    whereby an improved link is established between said exchange and said telephone station set.

2. The apparatus defined by claim 1 wherein said pair of lines comprises a twisted pair of lines.

3. The apparatus defined by claim 2 including a pair of hybrid networks, one coupling said uplink circuit means to one end of said pair of lines and the other coupling the other end of said pair of lines to said downlink circuit means.

4. The apparatus defined by claim 3 wherein said computer means comprises a buffer memory interconnecting a time division multiplexed bus of said exchange with said uplink circuit means, said buffer memory being controlled by a microprocessor.

5. The apparatus defined by claim 4 wherein said uplink circuit means and said downlink circuit means each include a modulator and demodulator means for modulating signals transmitted onto said pair of lines and for demodulating signals received from said pair of lines.

6. The apparatus defined by claim 5 wherein said modulator means of said uplink circuit means and downlink circuit means implement Manchester encoding.

7. The apparatus defined by claim 2 or claim 6 wherein said control means of said downlink circuit means includes an uplink status register which receives control signals directly from said telephone station set.

8. The apparatus defined by claim 7 wherein one of said signals received directly from said telephone station set by said status register is an offhook switch signal.

9. A digital link apparatus for providing digital communications between a branch exchange and a voice channel and digital ports comprising:
    computer means for preparing and interpreting messages in a predetermined format coupled to said exchange;
    uplink circuit means for receiving said messages from said computer means and for transmitting said messages to said computer means;
    a transmission line coupled to said uplink circuit means for receiving said messages from said uplink circuit means and for transmitting said messages to said uplink circuit means;
    downlink circuit means coupled to said transmission line for receiving said messages from said transmission line and for transmitting said messages onto said transmission line, said downlink circuit means including:
    (a) a voice channel;
    (b) at least one digital port, and selection means for selecting a plurality of digital circuits external to said uplink circuit means for coupling to said port;
    (c) control means for receiving and transmitting control signals for said voice channel and external circuits and for providing control signals for said selection means;

(d) timing means synchronized with said messages for coupling a first field from said message to said voice channel and a second field from said message to said control means;

(e) said control means including circuitry permitting serial asynchronous data reception and transmission through said port with different protocol than used over said transmission line, whereby a flexible, digital link is realized.

10. The apparatus defined by claim 9 wherein said transmission line comprises a pair of lines.

11. The apparatus defined by claim 10 wherein each of said uplink and downlink circuit means includes modulation means for modulating signals transmitted onto said pair of lines and demodulating means for demodulating signals received from said pair of lines.

12. The apparatus defined by claim 11 wherein said modulation means provides Manchester encoding.

13. The apparatus defined by claim 9 wherein said computer means includes a buffer memory coupled between said exchange and said uplink circuit means.

14. The apparatus defined by claim 13 wherein the contents of said buffer memory are continually transmitted to said uplink circuit means for transmission to said downlink circuit means.

15. The apparatus defined by claim 14 wherein said downlink circuit means includes logic means for examining said second field of said message and for determining when a newly complete message has been transmitted to said downlink circuit means.

16. The apparatus defined by claim 15 wherein said second field of each of said messages is transmitted to said downlink circuit means at least twice.

17. The apparatus defined by claim 16 wherein said transmission line is a pair of lines, and including a pair of hybrid networks, one coupling said uplink circuit means to said pair of lines and the other coupling said downlink circuit means to said pair of lines.

18. The apparatus defined by claim 17 wherein said uplink circuit means is fabricated on a single substrate and wherein said downlink circuit means is fabricated on a single substrate.

19. A digital link apparatus for providing digital communication between a branch exchange and a voice channel, data channel and digital data port comprising:

a computer means for preparing and interpreting messages in a predetermined format coupled to said exchange;

a pair of lines;

uplink circuit means for receiving messages from said computer means and for preparing the messages for transmission over said pair of lines and for receiving messages from said pair of lines and preparing the messages for transmission to said computer means;

downlink circuit means coupled to said pair of lines for receiving messages from said pair of lines and for transmitting messages onto said pair of lines, said downlink circuit means including:

(a) a voice channel
(b) a data channel;
(c) a digital data port;
(d) modulation means for modulating and demodulating said messages received from, and transmitted onto, said pair of lines;

(e) control means coupled to said modulation means for receiving control signals from messages and for placing control signals in messages.

(f) timing means, synchronized with the messages for coupling a first field of the messages to said voice channel, a second field of the messages to said data channel and a third field of the messages to said control means, said timing means coupled to said modulation means;

(g) said control means (i) for communicating control signals to and from said voice channel and data channel, (ii) for selecting circuits external to said uplink circuit means for coupling to said digital port, and (iii) for communicating control signals to and from said digital port;

whereby a flexible digital link is realized.

20. The apparatus defined by claim 19 wherein said uplink circuit means and downlink circuit means includes circuitry for detecting errors in messages received from said pair of lines, said uplink circuit means communicating the detecting of an error to said computer means and said downlink circuit means communicating the detection of an error at least to said voice channel.

21. The apparatus defined by claim 19 wherein said computer means includes a buffer memory and wherein the content of said buffer memory are continually transmitted through said uplink circuit means to said downlink circuit means.

22. The apparatus defined by claim 21 wherein said downlink circuit means includes logic circuits for detecting when a newly complete message has been transmitted to said downlink circuit means.

23. The apparatus defined by claim 19 wherein one of said external circuits coupled to serial digital port is part of a keyboard.

24. The apparatus defined by claim 23 wherein said digital port provides a serial asynchronous link of different protocol than the protocol used over said pair of lines.

25. The apparatus defined by claim 24 wherein said third fields are retransmitted over said pair of lines by said control means to said uplink circuit means to verify that said third fields were correctly received by said downlink circuit means.

26. The apparatus defined by claim 24 including a register in said downlink circuit means for storing at least a portion of said third field from sequential frames of said messages to provide said control signals for said voice channel, data channel and digital port.

27. The apparatus defined by claim 26 wherein said uplink circuit means includes modulation means for modulating and demodulating messages transmitted by said pair of lines.

28. The apparatus defined by claim 27 wherein said modulation means of said uplink circuit means and downlink circuit means provide Manchester encoding for messages transmitted over said pair of lines.

29. The apparatus defined by claim 28 including hybrid circuit means for coupling said uplink circuit means to said pair of lines and for coupling said downlink circuit means to said pair of lines.

30. The apparatus defined by claim 29 wherein said uplink circuit means is an integrated circuit fabricated on a single substrate and wherein said downlink circuit means is an integrated circuit fabricated on a signle substrate.

31. In a digital link for providing digital communications between a branch exchange which operates with a first timing signal and a digital link which operates with a second timing signal, an improvement comprising:
  a pair of lines;
  uplink circuit means for receiving data from said exchange for transmission over said pair of lines and for coupling data received from said pair of lines to said exchange;
  downlink circuit means coupled to said pair of lines for receiving data from said pair of lines and for coupling data to said pair of lines;
  said uplink circuit means including:
  (a) multiplexer means for receiving data at a rate synchronized with said second timing signal;
  (b) delay means for receiving data and delaying said data said delayed data being coupled to said multiplexer means and being timed by said second timing signal;
  (c) phase detection means for comparing the phases of said first and second timing signals, said phase detection means coupled to said multiplexer means for controlling said multiplexer means; and,
  (d) gating means for gating the output of said multiplexer said gating means operating under the control of said first timing signal,
  whereby data from said digital link is converted from the time base of said link to the time base of said exchange.

* * * * *

UNITED STATES PATENT AND TRADEMARK OFFICE
CERTIFICATE OF CORRECTION

PATENT NO. : 4,642,805

DATED : 02-10-87

INVENTOR(S) : Dumas et al

It is certified that error appears in the above-identified patent and that said Letters Patent is hereby corrected as shown below:

| Column | Line | |
|--------|------|---|
| 2 | 23 | delete "staion", insert --station-- |
| 2 | 29 | delete "FIG. 9", insert --FIG. 4-- |
| 16 | 67 | delete "signle", insert --single-- |

Signed and Sealed this

Fifth Day of September, 1989

Attest:

DONALD J. QUIGG

*Attesting Officer*

*Commissioner of Patents and Trademarks*